Sept. 29, 1953 — R. J. S. PIGOTT — 2,653,517
METHOD OF APPLYING CUTTING LIQUIDS
Filed May 29, 1951 — 6 Sheets-Sheet 1

INVENTOR.
REGINALD J. S. PIGOTT
BY
HIS ATTORNEY

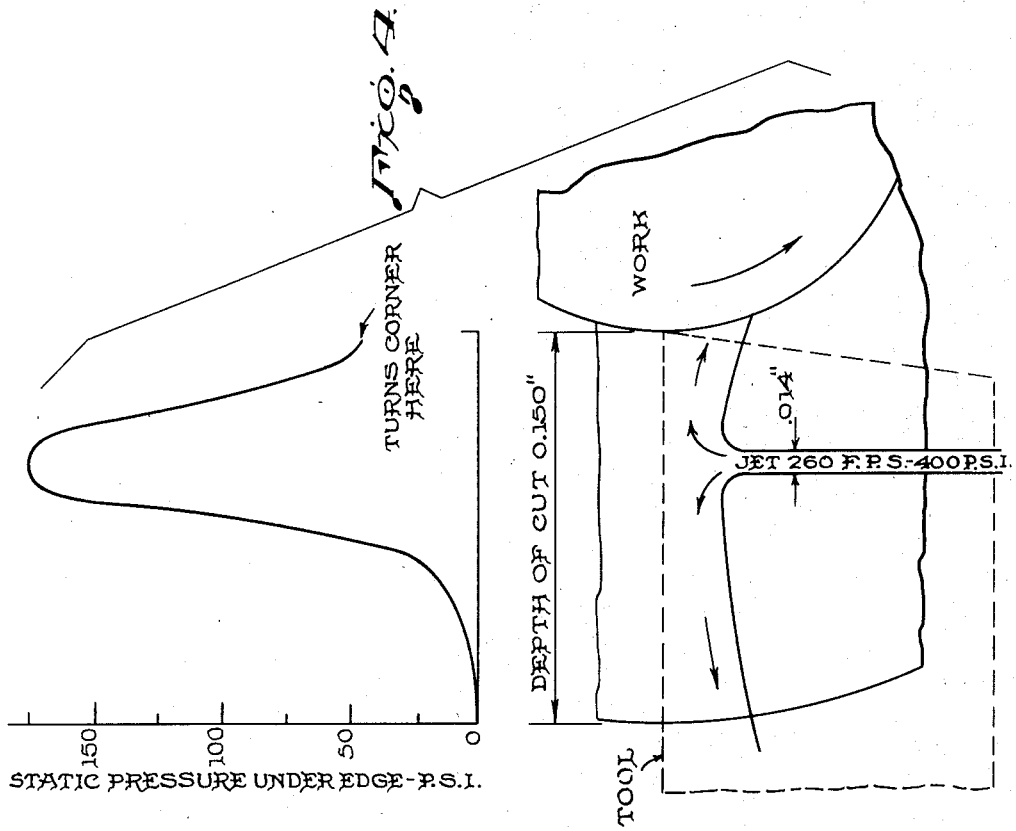
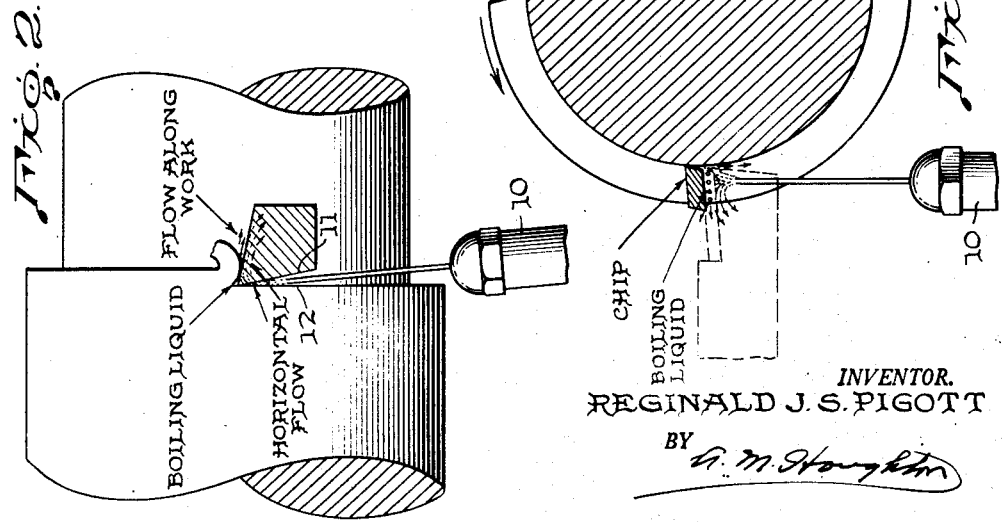

Sept. 29, 1953      R. J. S. PIGOTT      2,653,517
METHOD OF APPLYING CUTTING LIQUIDS
Filed May 29, 1951      6 Sheets-Sheet 3
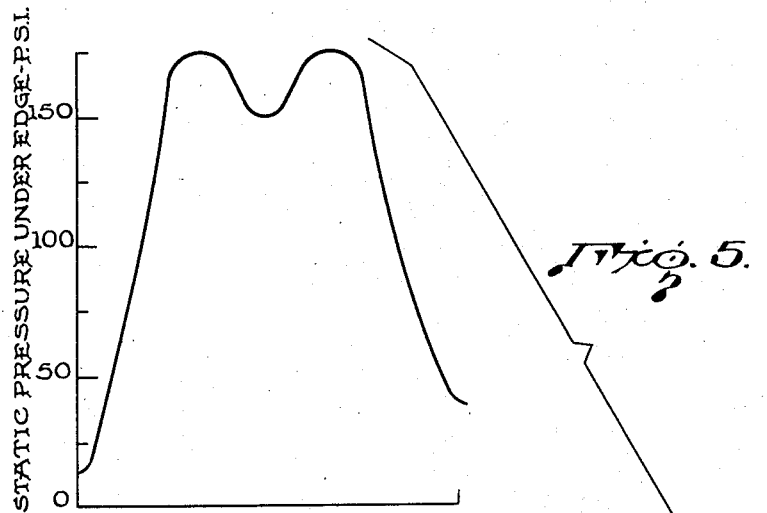
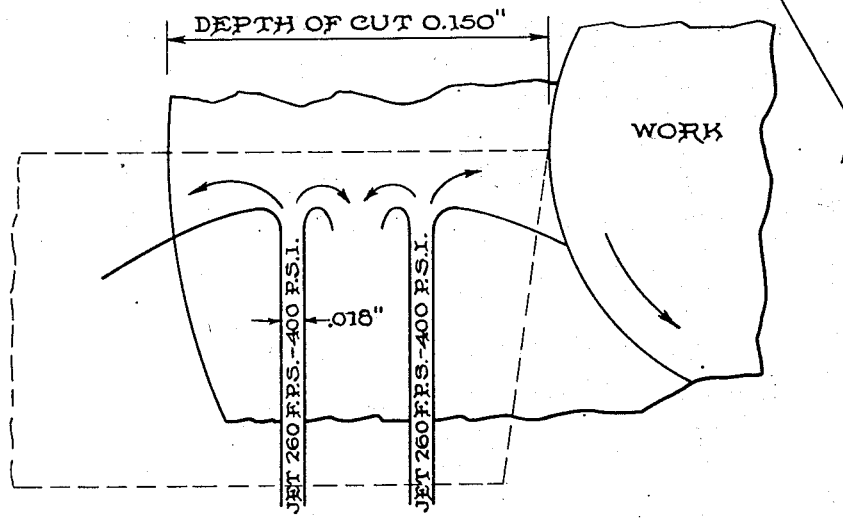
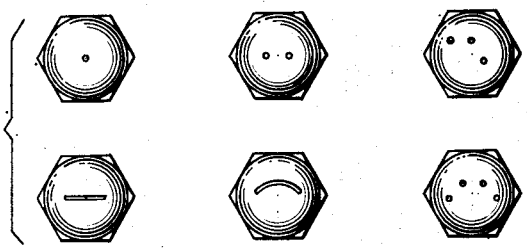
INVENTOR.
REGINALD J. S. PIGOTT
BY
HIS ATTORNEY Sept. 29, 1953     R. J. S. PIGOTT     2,653,517
METHOD OF APPLYING CUTTING LIQUIDS
Filed May 29, 1951     6 Sheets-Sheet 4
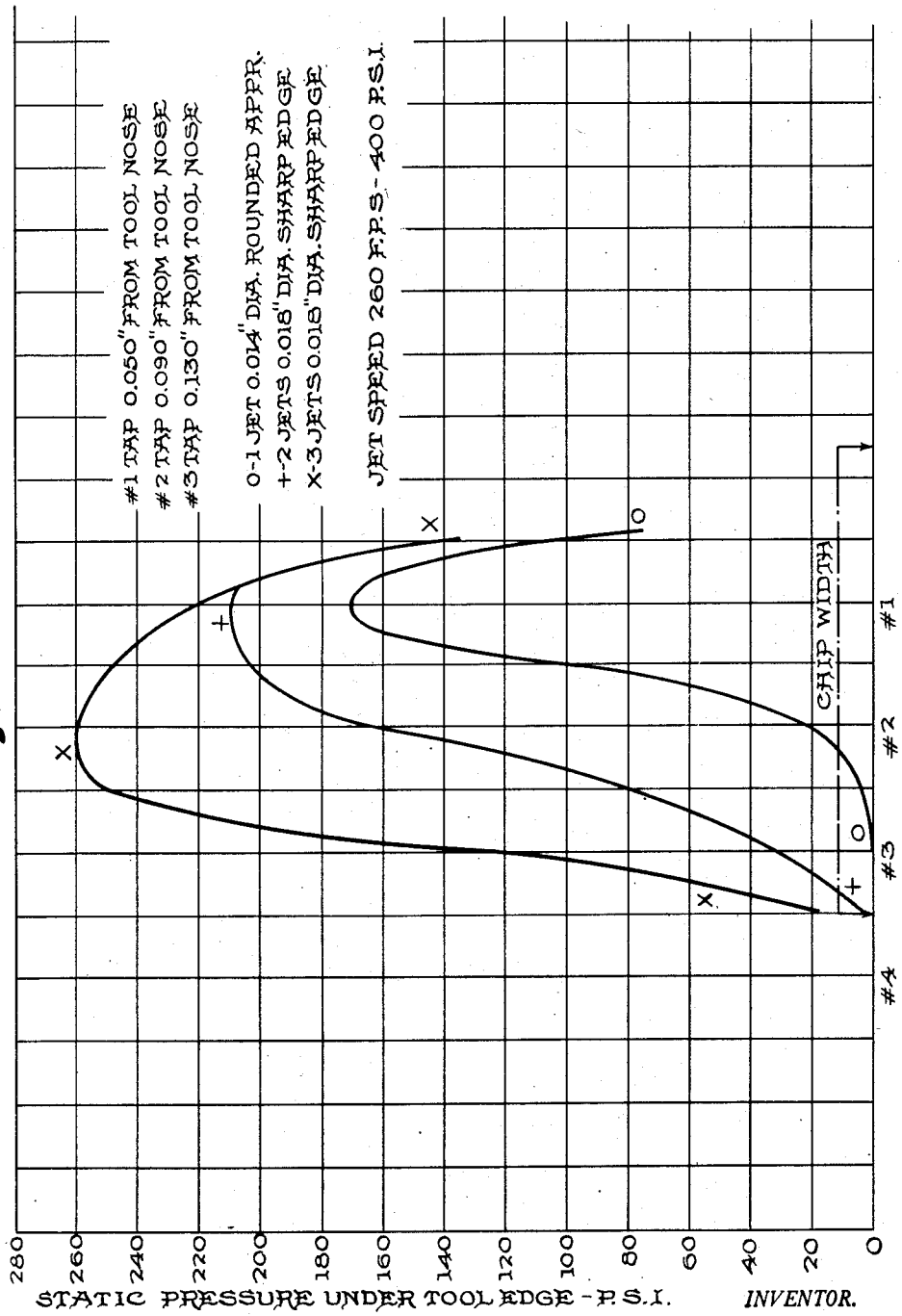
INVENTOR.
REGINALD J.S. PIGOTT
BY
HIS ATTORNEY Sept. 29, 1953 R. J. S. PIGOTT 2,653,517
METHOD OF APPLYING CUTTING LIQUIDS
Filed May 29, 1951 6 Sheets-Sheet 5
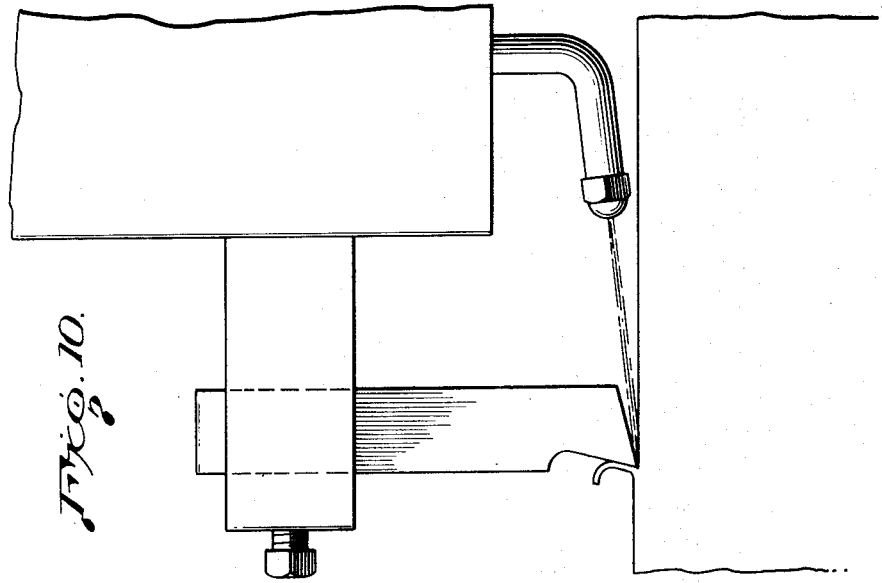
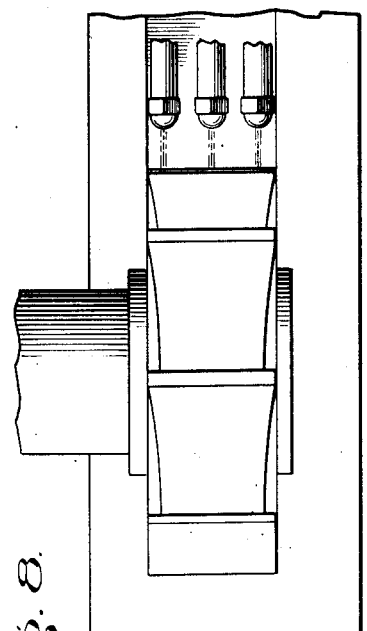
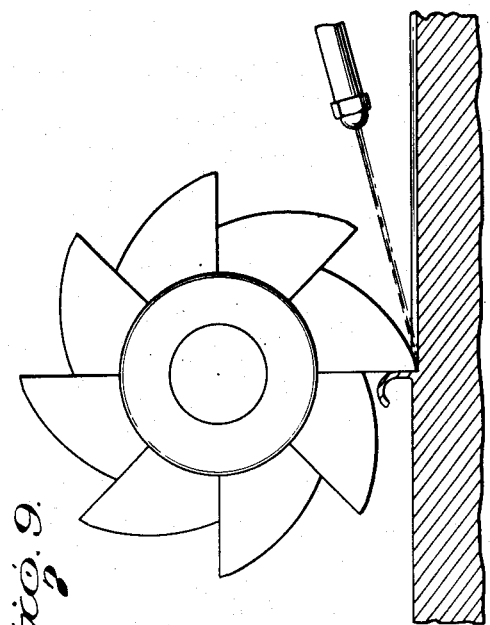
INVENTOR.
REGINALD J. S. PIGOTT
BY
HIS ATTORNEY

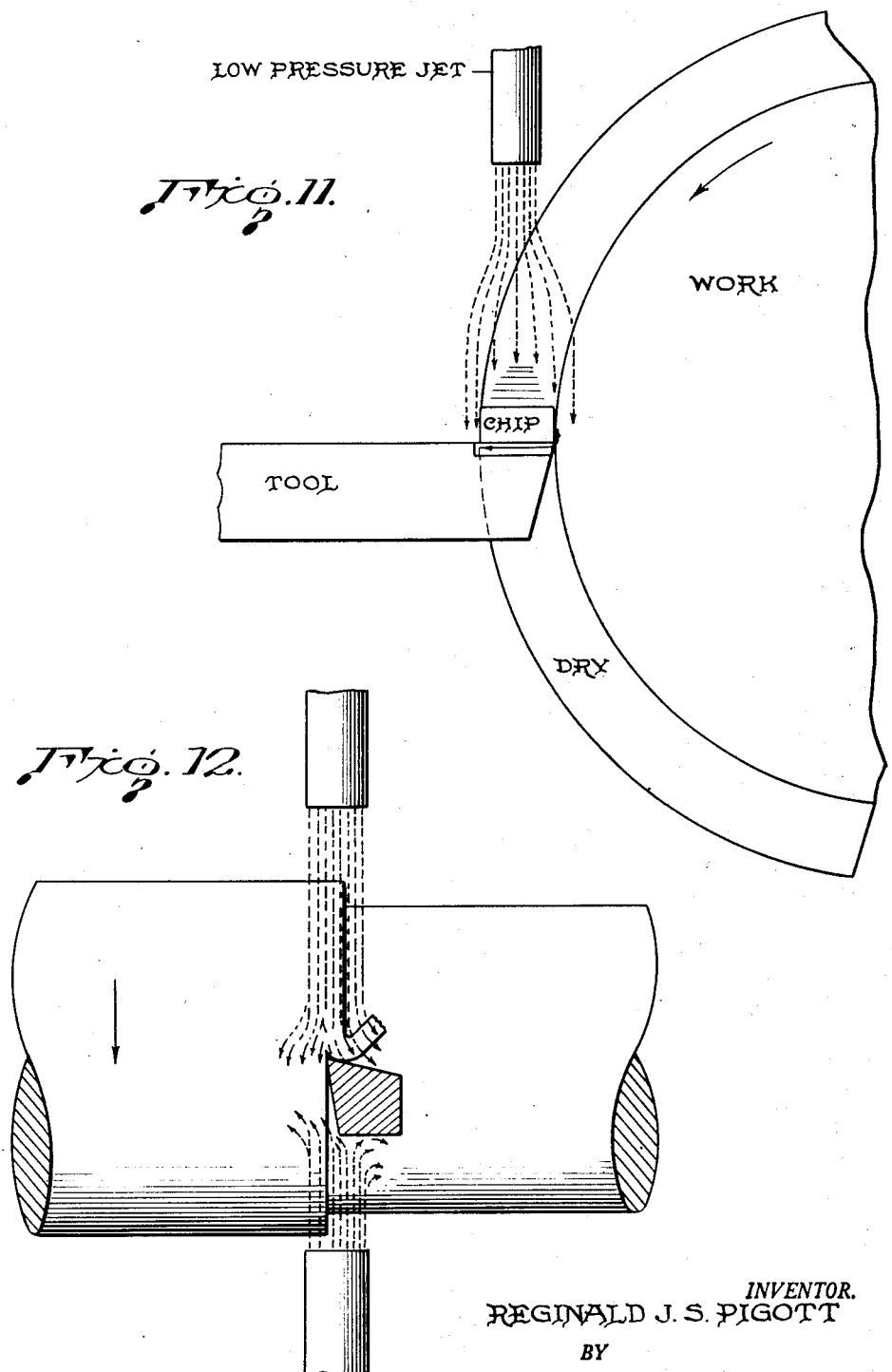

Patented Sept. 29, 1953

2,653,517

UNITED STATES PATENT OFFICE 2,653,517

METHOD OF APPLYING CUTTING LIQUIDS

Reginald J. S. Pigott, Pittsburgh, Pa., assignor to Gulf Research & Development Company, Pittsburgh, Pa., a corporation of Delaware Application May 29, 1951, Serial No. 228,843

1 Claim. (Cl. 90—11)

This invention relates to a method of applying cutting liquids in metal working operations such as turning, boring, shaping, and milling, wherein tool life is increased by adequate lubrication and effective cooling of the cutting edge of the tool.

Oils and other liquids have been applied in these various operations with a view to increasing the life of the tool over that obtained by dry cutting. In fact, an industry of some size has grown up in the marketing of special liquids for the purpose, including animal oils, mineral oils combined with both animal oils and other substances, and also water-soluble materials and water-oil emulsions. However, the gain in tool life resulting from their use has been disappointingly small compared to what should be expected in changing from dry to lubricated cutting. Tool life may vary as much as four hundred per cent but at best has heretofore been but a matter of minutes at their highest recommended cutting speeds. In tests made under usual conditions, rate of feed of the tool, depth of cut, etc., and following the conventional practice of flowing a stream of cutting oil downwardly on the region of cut, in five tests in a lathe turning operation, with identical tools and on the same work or metal being cut the tool life ranged from 14 to 35 minutes, at maximum recommended cutting speed for the material being cut.

In applying cutting liquids in the conventional manner the phenomenon of "build-up" is generally present, this being the accumulation of fine particles torn off the work in cutting. These particles weld on the top of the cutting edge and form a rather rough surface, work hardened, which is probably one of the major causes of wide variation in tool life in any given set of conditions. Lack of uniformity is to be expected in the case of dry cutting because of build-up, etc., and the tools will show quite variable types of edge failure and "cratering," i. e., the edge breaks off and "washes," and there is a crater formed in the top surface of the tool by abrasion of the chip rubbing without lubrication on the top. The application of cutting oil might be expected to ameliorate these conditions, but actually when it is applied in the conventional copious stream at low speed the variations are equally wide and tool life is not sufficiently prolonged.

I have discovered that early tool breakdown is attributable in large part to failure of the cutting oil to reach the edge of the tool in adequate amount to cool and lubricate it.

Ordinarily, the cutting oil is flowed downwardly over the tool either by gravity or under low pressure in a large and copious stream, but the chip which is formed overlies and shields the cutting edge so that only an insufficient amount of oil, if any, may find its way around the chip to the tool edge. Effective application of the cutting oil is further impeded by movement of the cut surface which is continuously receding from the point of cut and thereby dragging the oil away from the region of the tool edge. Accordingly, with the conventional overhead stream, little or no cutting oil directly reaches the cutting edge and it is cooled solely by conduction through the chip and tool shank. The absence of oil at the cutting edge is shown by the fact that the cut surface leaving the tool edge is bright and dry.

Attempts have been made to place the cutting oil close to the edge of the tool by directing its flow upwardly into the wedge-shaped space between the tool and work, but with negligible improvement in results. The hitherto unrecognized difficulty has been that at the low pressures of discharge employed, the low velocity of the stream is insufficient to overcome the drag exerted by the moving work and further, since the stream is large in diameter it does not enter the clearance between the work and relief surface of the tool cleanly and without side splash, and its energy is largely dissipated in entering the clearance in the region of its greatest breadth so that the oil cannot penetrate to the extremely small clearance where the surfaces of the tool and work converge into contact with each other.

I have discovered that a thin or needle-like jet of cutting fluid which has high velocity imparted to it under pressure greatly in excess of pressures presently employed may be placed close to the cutting edge of the tool without impinging upon the heel of the tool or otherwise dissipating its energy before reaching the region of extremely small clearance, at which point the force of its impact and suddenly redirected flow parallel to the cutting edge is transformed into static pressure under the tool edge, with the result that the edge is effectively cooled and lubricated. Manifestly, this static pressure is not alone sufficient to overcome the pressure of the cutting edge against the work, which is of the order of 50,000 p. s. i. (pounds per square inch), but its demonstrated usefulness in achieving positive lubrication and direct cooling of the cutting edge can be explained by a theory which will be later discussed.

It is accordingly an object which is achieved by my invention to so apply a coolant and lubricant directly to a metal cutting tool that the cutting edge will be adequately lubricated and more effectively cooled, thereby avoiding build-up on the cutting edge and thus increasing the life of the tool, while at the same time the surface finish of the work will be improved.

The foregoing and other objects and advantages will be apparent from the following description and drawings wherein Figure 1 is a schematic layout of the system.

Figure 2 is an enlarged detail view showing the manner of applying a fine liquid jet and illustrating the flow paths of the liquid.

Figure 3 is a view transverse to that of Figure 2, also illustrating the operational theory of this invention.

Figure 4 is a graph of static pressure and a correlated diagrammatic representation of the jet as applied to the tool in the same relative relation of tool and work as is shown in Figure 3.

Figure 5 is similar to Figure 4 except that it illustrates the distribution of static pressure where two jets are employed.

Figure 1:
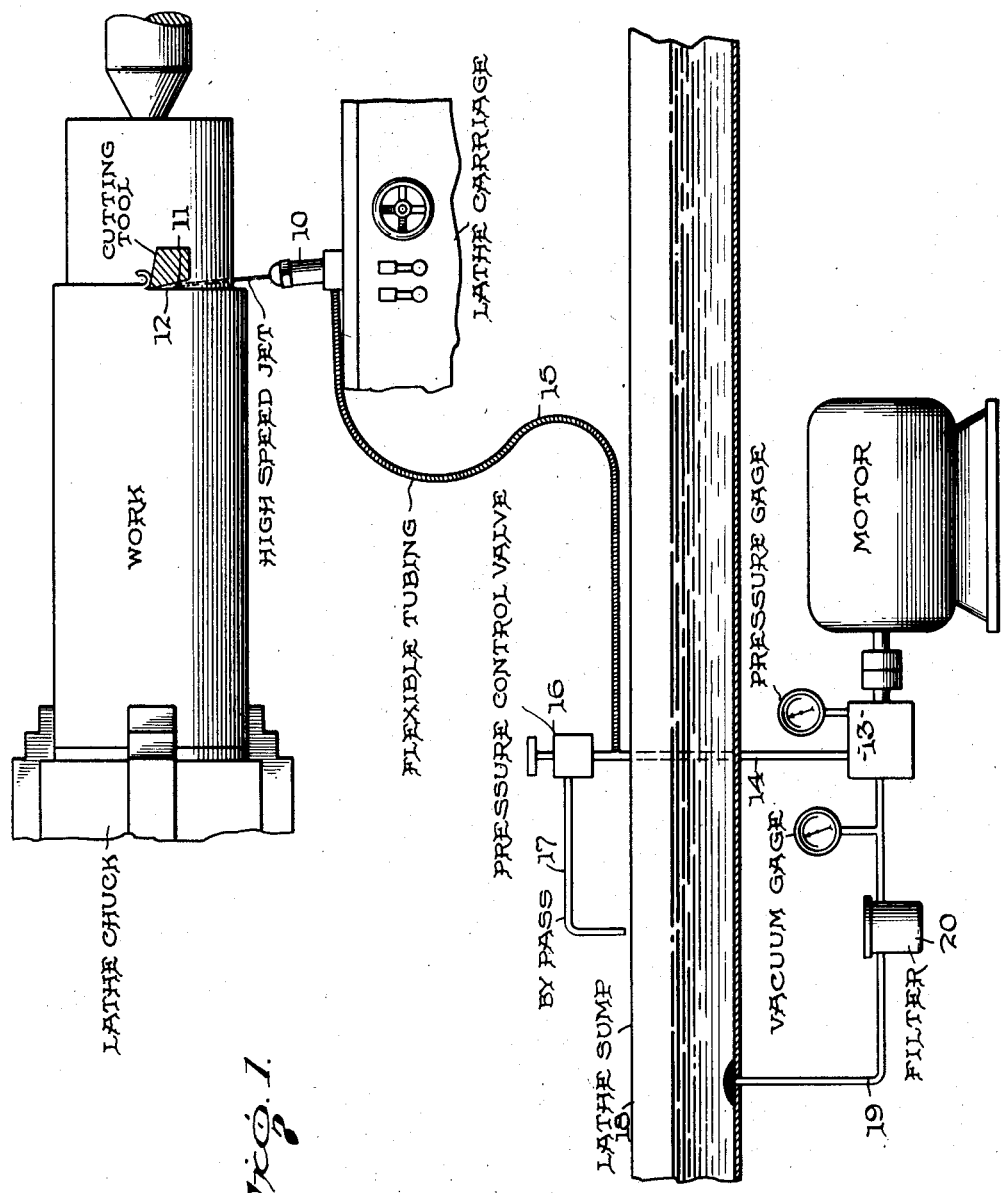

Figure 6 collectively shows a number of suitable nozzle orifice arrangements.

Figure 7 is a composite graph of static pressures obtained where combinations of one, two, and three jets were employed.

Figure 8 is a plan view of a milling cutter with three jets as applied according to this invention.

Figure 9 is a side view of the milling cutter, partly in section to show the formation of the chip and application of the jet or jets.

Figure 10 shows the invention as applied in a shaping operation.

Figures 11 and 12 illustrate the conventional application of large and copious streams of cutting liquid from above the tool and also from both above and below it.

Referring more particularly to the drawings, and first to Figure 1 which shows the elements of the system employed in a lathe turning operation, a nozzle 10 which has small orifice producing a uniformly thin and solid liquid jet not larger than 0.020 in. for a ½″ tool bit is mounted on the lathe carriage and is directed to project a fine stream of cutting liquid at high velocity into the wedge-shaped space between the side relief surface 11 of the tool and the surface 12 of the cut. Larger tool bits permit of the use of larger diameter jets of cutting liquid, but in any case it is essential that the jets be of smaller diameter than the gap between the heel of the tool and the moving work.

Cutting liquid is supplied to the nozzle under a pressure of 300 p. s. i. or higher by a motor driven pump 13 which is desirably of the rotary positive displacement type, having an internally toothed ring gear and meshing pinion of one tooth difference, the liquid being pumped through pipe 14 and flexible tube 15 to the nozzle. A pressure control valve 16 in the piping between the pump and nozzle relieves excessive pressure by opening a bypass 17 to return excess liquid to the sump 18 in which a supply of the cutting liquid is maintained. The pump draws its supply of liquid from the sump through pipe 19 and filter 20, the latter serving to remove metal chips and dirt which, if passed through the line, might clog the small orifice in the nozzle.

The space between the side relief face of the tool and the rotating work is wedge-shaped, as shown in Figure 2, and in the region of the cutting edge (say within .001–.002 in.) it tapers down to the order of .00001 inch to .000001 inch in breadth. Resistance to flow into such a small clearance, especially with the work side moving against the flow at 1.5 F. P. S. (feet per second), or more, is extremely high and the streams hitherto occasionally used from underneath the tool for flooding have far too little energy to inject cooling fluid to any point near enough to the cutting edge to effectively cool it. Experimental results where conventional large and low speed jets flowing at 3 to 5 F. P. S. were applied at pressures up to 50 p. s. i. showed no material benefit. They demonstrated that at velocities of 3 to 5 F. P. S. the energy is too low to penetrate into the region near the cutting edge and further that where the jets are larger than the gap between the heel of the tool and the work, there is lateral splash at the bottom of the tool which goes both ways and interferes with that portion of the main stream opposite the gap, thereby further dissipating the already insufficient energy.

Tests were conducted under uniform conditions employing cutting speed 110 F. P. M. (feet per minute); feed 0.011 in./rev.; depth of cut 0.150 in.; oil stream temperatures 100° F., in obtaining the following data:

With the conventional overhead stream flowing at 3 to 5 F. P. S. and circulating at 2.7 gallons per minute, the cutting edge was cooled 30° F., whereas with a high speed, thin jet at 260 F. P. S., and circulation of only 0.15 gallon per minute, the work was cooled 75° F., or 45 times as much heat was removed per gallon of liquid circulated. The difference between this figure and the gain from velocity alone is accounted for by two factors; first, the cooling with the ordinary overhead stream is done on the chip and the shank of the tool bit, and the heat from the cutting edge, as above mentioned, must be transmitted through the chip and along the shank, introducing a heavy resistance to heat-flow by a factor of approximately 1:3; second, the upper stream of oil is large in diameter (½ inch or more) and spreads in a relatively thick stream over the chip and the tool shank. Since the coefficient of heat transfer in oil is very low, none of the stream farther than 0.01 to 0.02 inch from the surface to be cooled absorbs any heat, and therefore the bulk of the stream is ineffective in cooling. On the other hand, in the case of the high speed jet, the whole diameter of the solid stream is not in excess of 50% to 75% of the space between the bottom of the heel of the tool bit and the moving work and on entering the narrow opening between the heel of the tool and the surface of the work, the liquid immediately spreads out in a thin sheet, which is less in thickness than the original jet. Consequently, the whole body of this thin sheet is effective in cooling. Twice the cooling is obtained with one-twentieth of the oil circulation. The high velocity of flow over the surface of the tool bit also increases the heat transfer four or five times that of the low speed usual flow.

The high speed jet so applied close to the cutting edge of the tool builds up static pressure, as is shown by reference to the graphs in Figures 2 to 5. The speed of the jet will produce this impact pressure opposite the jet under the tool edge, less the friction loss up the wedge passage. At its further penetration the liquid makes a right angle turn and in its continued lateral flow the pressure will be equal to the friction loss to produce the flow along the passage parallel to the tool edge. It is quite evident that the static pressure in the space between the tool and work, produced by stopping and turning the high speed jet, could not possibly force the oil past the tool edge where it is in actual contact with the work. It could not in any case exceed the initial pressure to produce the jet (300 p. s. i. to 600 p. s. i.) and in general will be much less, whereas the pressure between the tool edge and the work will be of the order of 50,000 p. s. i. Therefore, we must look to another mechanism to explain the accomplished result.

The temperature of the cutting edge of the tool is about 1000° F., while the boiling point of oils used will not much exceed 500° F. It is therefore clear that close to the cutting edge, where the temperatures are above 500° or so, the oil will boil and give off vapor. The roughness of the surface cut, as measured, is 40 to 60 microinches, while the microscopic irregularity of the cutting tool edge is 10 to 20 microinches. Thus, the tool edge does not contact the work in a continuous line as might be supposed, but there are microscopic gaps between the two, of 20 to 80 microinches. The pressure in the passage due to high jet speed (approximately 225 to 260 F. P. S.) could not flow oil of viscosities 100 to 200 S. U. S. through these microscopic passages as liquid oil. Vapor, however, can be and presumably is forced over the tool edge by the pressures available, which at 260 F. P. S. speed average as shown by tests plotted in Figures 4, 5, and 7. After having passed around the tool edge, the oil vapor condenses again into liquid oil since the work and chip are below boiling temperature of the oil. As a result, the cutting edge of the tool is continuously and adequately lubricated and cooled, not only by the liquid oil absorbing heat, but by the latent heat of vaporization in converting the liquid oil to vapor as it boils.

In order to demonstrate the existence of static pressure under the tool edge, produced by the jetted liquid, and to plot the static pressure parallel to the cutting edge, pressure taps were provided at various distances from the nose of the tool as indicated in Figure 7 by the four numbered positions shown along the chip length. These static holes were about .010 inch in diameter, spaced .040 inch apart. In this figure the jet speeds are all 260 F. P. S. which is that produced by sharp-edged or short rounded nozzles, at pressure of 400 pounds. Such orifices produce a clear, solid stream as distinguished from a dispersed, "broomy" flow (c. f. Marks' Mechanical Engineers' Handbook, fourth ed. 1941, pp. 253–255). The static pressure under the tool edge is generated by deceleration of the jet velocity as the jet strikes the top of the wedge-shaped channel and is forced to turn at a right angle. It is to be remembered that if the single jet is located exactly in the center of the cut the static pressures will be exactly symmetrical on each side of the jet, but in actual application, the jet is near the nose of the tool and turns a corner. This will tend to raise the static pressure on this side of the jet, as shown. As will be observed in Figure 7, with two jets there was not only an increase of peak pressure but the static pressure was increased over the remainder of the chip width. With three jets the static pressure underneath the edge was maintained at positive value to the end of the chip, or cut. With the test set-up, tap No. 4 for this particular depth of cut was outside the cut and therefore gave zero reading.

In practicing this invention, at usual cutting speeds of 100 to 400 F. P. M. the full effect is experienced with a jet of from 240 to 260 F. P. S. velocity (350 to 400 p. s. i.). Some deterioration is noted under these conditions when the jet velocity falls below 225 F. P. S. (300 p. s. i.). Below 185 F. P. S. (200 p. s. i.) the effect falls off and the results are better than for the usual low speed flow, but not to the large degree found above jet speeds of 225 F. P. S. In referring herein to a high speed jet it will therefore be understood that what is meant is one having a velocity exceeding 185 F. P. S., or more than 100 times the speed of the work, when cutting with high speed steel bits, or 40 times the speed of the work when cutting with carbide bits (i. e., the relative speed of the work and tool, as where either one is moving relative to the other. The rate of flow of the applied liquid is from 0.10 to 0.15 gallon per minute, and the diameter of the jet is not in excess of 0.020 inch for a ½ inch tool bit. Pump pressure must be in excess of 200 p. s. i. and is preferably in the range of 350 to 400 p. s. i.

Figures 11 and 12 illustrate the conventional application of flooding streams of cutting liquid directed outwardly on the chip, and also upwardly from beneath the tool as well as downwardly. As indicated by the arrows, the liquid does not reach the cutting edge of the tool for, as tests with the same test apparatus have proved, no static pressure is developed under the edge of the tool.

The finish obtained with the usual low speed overhead stream is 150 to 200 R. M. S. microinches roughness (R. M. S.=root mean square; microinches=0.000001 in.). With the high speed jet it is 40 to 60 R. M. S. microinches. This improvement in finish is valuable in that it may eliminate finishing cuts before finish grinding. Further, the change in diameter of the bar, due to wear of the tool point, is greatly reduced and most of the change is in the last inch of axial length of the cut. For example, the total diameter change due to wear of the end of the tool is but .001 to .002 inch at 2½ to 4 inches diameter instead of .010 to .040 inch. This low wear allows improved accuracy of work and control of tolerances.

Similarly satisfactory results are obtainable with tungsten carbide tools as with high speed steel tools. Hitherto it has not been customary to employ coolants generally on tungsten carbide because of detrimental effects. Using oil, particularly, the tool appears to break down by crumbling. Since with the overhead stream the tool may be spattered or splashed at times, below the cutting edge, this irregular action gives rise to temperature shock which tungsten carbide does not stand well. With the high speed jet washing the tool surface directly and continuously, no temperature shock is produced, and with a surface speed of 40 F. P. M. tool life was increased 4 to 5 times, using soluble oil (5% oil-95% water emulsion).

As shown in Figure 6, the nozzle orifices may take the form either of single or plural openings, to accord with the tool shape and depth of cut or the jet may be of flattened shape where the orifice is formed as a slit. And as shown in Figures 8, 9 and 10 either one or more jets may be applied in any of the various metal cutting operations such as milling and shaping, as well as in turning.

The following data of seven production tests show tool life comparison between the jet and coolant system of the present invention and the conventional coolant system, under identical conditions:

Operation—18/5 turning Inconel M valve stems ("Inconel" is a tough, high nickel content alloy produced by International Nickel Company)
Machine—Bardons & Oliver
Feed—.004" per revolution
Speed—345 R. P. M.
Oil—paraffin base
Tool overhang from post—1"
Tool height—.006" below center
Tool number—D. C. 1053 carbide
Normal coolant pressure—8 p. s. i. at pump
High speed jet pressure—400 p. s. i.
Depth of cut—0.234
Average valve stems per tool:
    Present invention—34.4
    Conventional coolant system—5.1

These results show that with the present system there was an average increase in tool life of 6.7 times over that obtained with conventional procedures. Noticeable improvement in surface finish was also realized where the jets were utilized.

A study of the tools following completion of the test showed that without the jets the tool radius wore flat, the cutting edge had a slight build-up, and the "burn" area was greater than with the jets. There was no cutting edge build-up and the radius held good when the jets were used. The lands of the tools wore very jagged but failed to break down completely as is normal without jets. The results obtained with the regular oil system were similar to those obtained on the production line.

In the foregoing description I have exponded the theory that the high speed jets, because of their small diameter and high velocity, can be placed sufficiently close to the tool edge to be in a region where the oil, vaporized by the heat of the tool, is forced by static pressure through microscopic gaps between the tool edge and surface of the cut, to again condense on the top of the tool rearwardly of the cutting edge. The evidence that boiling takes place is shown in clouds of smoke and vapor coming off the tool. This may be quenched by a conventional overhead flowing stream which also is a desirable and effective means of drowning splash from the underlying high speed jet but otherwise does not contribute significantly to the effect produced by the present system. The suppression of splash is accomplished by the heavy stream of oil which flows down around the chip and tool shank forming an enveloping barrier to oil splashed as a result of impingement of the high velocity jet under and back of the cutting edge of the tool.

While my theory as aforesaid is a tenable and sound explanation of the improved results achieved by this invention, it is not intended to preclude the possibility that the results of utilizing a thin, high speed jet may be attributable at least in part to other forces, for example, to capillary attraction of the oil deposited in the extremely small clearance just back of the tool edge. Thus, although the inventive concept is not restricted to any special theory of operation, the fact that the cutting edge of the tool is both directly cooled and positively lubricated is attested by the more effective and greater reduction in temperature of the cutting edge of the tool than is obtainable when a conventional copious stream of liquid is used. It is further evidenced by the absence of build-up at the cutting edge and by a tool life from 6 to 8 times greater than that heretofore obtained at normal cutting speeds, and as much as 20 times greater at higher than normal cutting speeds.

What I claim as my invention is:

The method of cooling and lubricating the cutting edge of a metal working tool, which comprises projecting an unbroken, non-spreading, needle-like jet of cutting fluid through the rearward angular space between the tool and the work leaving the point of cutting contact, directing said jet at the line of cutting contact of the tool and the work, said jet moving at a linear speed of more than forty times the relative speed of the work and the tool and in any event not less than 185 feet per second, and having a fine uniform thickness throughout its length of a size not larger than required to engage the zone of cutting contact only, without prior engagement of the side of the tool or the work as would substantially reduce the kinetic energy of the jet prior to reaching the line of contact of the tool with the work.

REGINALD J. S. PIGOTT.

References Cited in the file of this patent

UNITED STATES PATENTS

| Number | Name | Date |
|---|---|---|
| 995,256 | Kearney et al. | June 13, 1911 |
| 1,695,955 | Frayer | Dec. 18, 1928 |
| 1,789,841 | Rennick | Jan. 20, 1931 |
| 2,434,679 | Wagner | Jan. 20, 1948 |
| 2,475,811 | Wagner et al. | July 12, 1949 |

OTHER REFERENCES

Machinery, February 1952, pages 166–169.